United States Patent Office 3,470,929
Patented Oct. 7, 1969

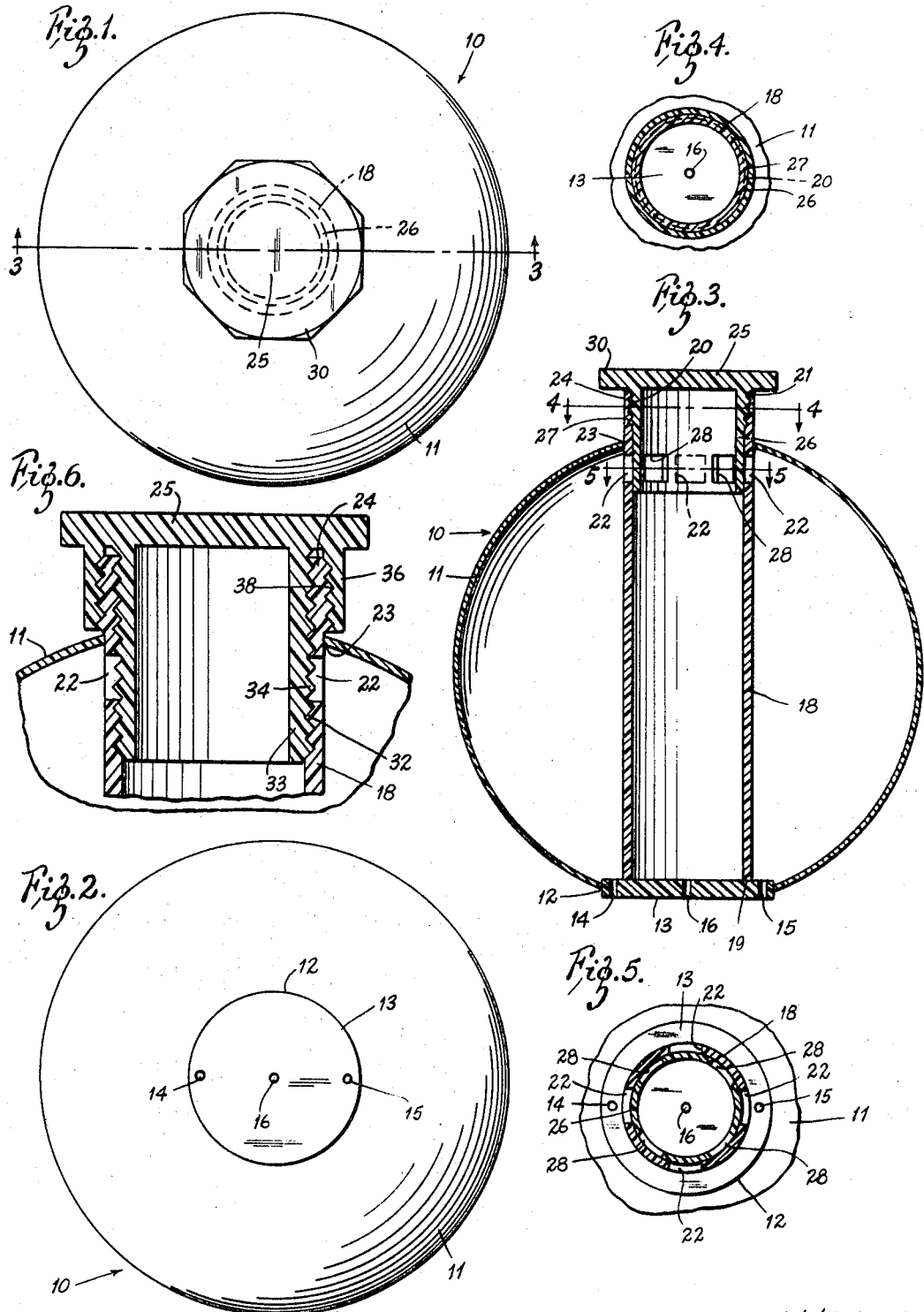

3,470,929
BEVERAGE CONTAINER
Stephen F. Thornton, 655 Hurstgreen Road,
Webster Groves, Mo. 63119
Filed Oct. 9, 1967, Ser. No. 673,795
Int. Cl. B65d 85/72, 37/00, 39/04
U.S. Cl. 150—.5                     5 Claims

ABSTRACT OF THE DISCLOSURE

A disposable beverage container having a flexible inelastic, and fluid-tight body for holding a beverage under pressure and maintaining its carbonation. An inner pressure release chamber. A combination valve and cap for first relieving the pressure of carbonation before removal for consumption of the beverage.

BRIEF DESCRIPTION OF THE INVENTION

This drink dispenser has a body wall made of a flexible substantially inelastic membrane, preferably of plastic. A central tube extends through openings at the top and bottom of the body wall, and the body wall is heat sealed at its openings to the periphery of the tube. The flexibility of the body wall permits the beverage container to be filled with a carbonated beverage, and the body wall's inelasticity maintains the pressure of the beverage to maintain its carbonation. The carbonated beverage product is introduced into the container through a self-sealing hole in its base. Air inside the container is displaced by the incoming beverage through another self-sealing hole that opens only when the pressure buildup is sufficient.

The central tube is fluid-tight and has a self-sealing hole at its lower end through which a needle may be inserted to draw a vacuum on the interior of the tube. The walls of the tube are rigid. The tube extends above the upper side of the elastic membrane, and a cap is threaded into the upper end of the tube. The cap has openings through a portion that extends into the tube. The tube has openings through its side wall just below the upper side of the elastic membrane. When the cap is threaded tightly into the tube, the holes do not match and a fluid seal is maintained. However, upon initial turning of the cap to remove it, the holes in the cap come into communication with the holes in the tube and permit release of the pressure of carbonation into the tube. This prevents fizzing of the beverage product. Thereafter, the cap is completely removed to enable consumption of the beverage.

BRIEF DESCRIPTION OF THE DRAWING

FIGURE 1 is a top plan view of the beverage container;

FIGURE 2 is a bottom plan view of the beverage container;

FIGURE 3 is a view in section taken along the line 3—3 of FIGURE 1;

FIGURE 4 is a view in section taken along the line 4—4 of FIGURE 3;

FIGURE 5 is a view in section taken along the line 5—5 of FIGURE 3; and

FIGURE 6 is a fragmentary view in section on an enlarged scale, showing a modified cap and control tube construction.

DETAILED DESCRIPTION OF THE INVENTION

This beverage container 10 has a flexible but substantially inelastic plastic body wall 11 which, when expanded under internal pressure, is preferably of spherical shape. A hole 12 in the bottom of the body wall 11 is heat sealed or otherwise sealed about the peripheral of a circular base 13. The circular base 13 is of flexible rubber or plastic. The base 13 should be sufficiently flexible to provide three self-sealing valve openings 14, 15, and 16 the functions of which will be described hereinafter. Alternatively, self-sealing valve elements (not shown) corresponding to the valve openings 14, 15, and 16 may be mounted in the base 13.

A central cylindrical plastic tube 18 extends upwardly from the base 13. The diameter of the tube 18 is less than the diameter of the base 13, and the lower end 19 of the tube 18 is heat-sealed or otherwise joined to the base 13 radially inwardly of the self-sealing valves 14 and 15. There are internal threads 20 adjacent the upper end 21 of the tube 18. Also, there are circumferentially spaced openings 22 through the side wall of the tube 18. There is an opening 23 through the upper side of the body wall 11 through which the tube 18 extends, the upper extension providing a lip section 24 for easy consumption of the beverage. The body wall 11 is heat-sealed or otherwise sealed to the tube 18 at the opening 23 at a location above the holes 22 and below the lip section 24. The volume within the tube 18 provides a pressure release chamber.

A cap 25, preferably of plastic, has a downwardly extending cylindrical wall 26 having an externally threaded section 27 for engaging the threads 20 on the tube 18. Below the threaded section 27, there are a plurality of holes 28 peripherally spaced about the cylinder 26. There is an overlying flat sided head 30 on the cap that can be tightened against the upper end 21 of the tube 18.

In the modification of FIGURE 6, the tube 18 is formed as before described, except its internal threads 32 extend below the holes 22. The cap 25 is similarly formed, except it eliminates the holes 28 and the cylindrical wall 33 is longer and its external threads 34 extend the full height of the wall 33. When the cap is tightened in place, some of the threads 34 engage the threads 32 which are below the openings 22 to provide a fluid-tight seal. In addition, the cap may have an outer sleeve 36, preferably with internal threads 37 that are complementary to external threads 38 on the lip section 24 of the tube 18. This outer sleeve 36 keeps the lip section 24 clean and sanitary.

In use, the beverage container 10 is filled after the cap 25 has been threaded tightly in place with the holes 28 and the holes 22 unaligned in the FIGURE 3 embodiment or the cylinder 33 threaded below the holes 22 in the FIGURE 6 embodiment. Filling is done with the container inverted by inserting a needle through the valve 14, the needle being connected to a suitable tubing leading from a source of carbonated beverage (not shown). The container is filled to a pressure sufficient to maintain the carbonation of the beverage, such pressure being greater than atmospheric pressure. The self-sealing valve 15 is provided to permit the escape of air as the container is filled under the filling pressure and, when liquid begins to discharge through the valve opening 15, the filling pressure is released and the needle withdrawn from the valve 14. The valves 14 and 15 then automatically seal closed since the filling pressure has been released and the valves are designed to automatically close and remain closed under the normal internal pressure of the carbonated beverage. Such self-sealing valves are conventional in the art.

The self-sealing valve 16 permits insertion of a needle for drawing a vacuum on the pressure release chamber within the tube 18. Such a vacuum may be desirable for better pressure release as will now be described.

Once the container 10 has been filled with a carbonated beverage, it can be refrigerated to a temperature close to the freezing point of the liquid and during the refrigeration and for periods of time subsequent to refrigeration, the internal pressure will be maintained to maintain the carbonation in the drink.

For consuming the beverage, the cap 25 is rotated to remove it. In the embodiment of FIGURE 3, the non-alignment of the holes 22 and the holes 28 retains a fluid seal against the release of pressure into the tube 18. On initial rotation of the cap 25, the holes 28 move into alignment with the holes 22, releasing the pressure of carbonation into the chamber defined by the central tube 18. This release of pressure eliminates fizzing and undesirable escape of some of the beverage before the cap 25 has been removed. Thereafter, the cap 25 is completely removed and the beverage is consumed as facilitated by the lip section 24. When the cap has been removed, the beverage can flow through the holes 22 and through the opening within the upper lip 24 of the tube 18.

In the embodiment of FIGURE 6, the pressure seal is maintained by the engagement between the threads 32 and the threads 34 below the openings 22. Upon initial unthreading of the cap 25, the lower end of the cylindrical wall 33 is raised to unblock the openings 22 and permit the carbonation pressure to be released into the chamber within the tube 18. Thereafter, the cap 25 can be completely removed for consumption of the beverage.

After the beverage has been consumed, the container 10 can be discarded without the risk of broken glass. Thus, the beverage container 10 provides a disposable and non-breakable container that will maintain the carbonation of the beverage for a considerable period of time. It is particularly suitable for use at sporting and other public events where beverages carried in open cups tend to lose their carbonation and go flat between the time the cups are filled and the time the beverages are finally vended and consumed.

Various changes and modifications may be made within the purview of this invention as will be readily apparent to those skilled in the art. Such changes and modifications are within the scope and teaching of this invention.

What is claimed is:

1. A beverage container comprising a beverage chamber defined by a fluid-tight, flexible, substantially non-elastic body wall, means defining a fluid-tight pressure release chamber within the body, valve means for selectively establishing communication between the beverage chamber and the pressure release chamber, means to permit filling of the beverage chamber with a carbonated beverage, and a removable closure on the container for permitting consumption of the beverage following release of pressure to the pressure release chamber, the means defining the pressure release chamber comprising a central tube extending through an opening in a side of the flexible body wall, the flexible body wall being sealed to the periphery of the tube at the said opening, the removable closure comprising a cap removably threaded onto the end of the tube extended through the flexible body, the valve means being openable upon initial rotation of the cap for removal of the cap to release the pressure from carbonation of the beverage into the interior of the tube.

2. The beverage container of claim 1 including a self-sealing valve to permit drawing of a vacuum on the tube prior to removal of the cap.

3. The beverage container of claim 1 wherein the valve means comprises openings in the tube and openings in the cap normally non-aligned but being alignable upon initial rotation of the cap.

4. The beverage container of claim 1 wherein the valve means comprises openings through the tube normally blocked by the cap and being unblocked upon partial removal of the cap.

5. The beverage container of claim 1 wherein the means to permit filling of the beverage chamber comprises a self-sealing valve for filling the interior of the body with a carbonated beverage and another self-sealing valve for permitting the escape of air from the container during filling thereof with beverage.

References Cited

UNITED STATES PATENTS 2,139,792  12/1938  Bechaud _____ 220—1
3,321,097  5/1967   Solowey _____ 220—20.5 X GEORGE E. LOWRANCE, Primary Examiner U.S. Cl. X.R.

215—1, 6; 220—20.5